UNITED STATES PATENT OFFICE.

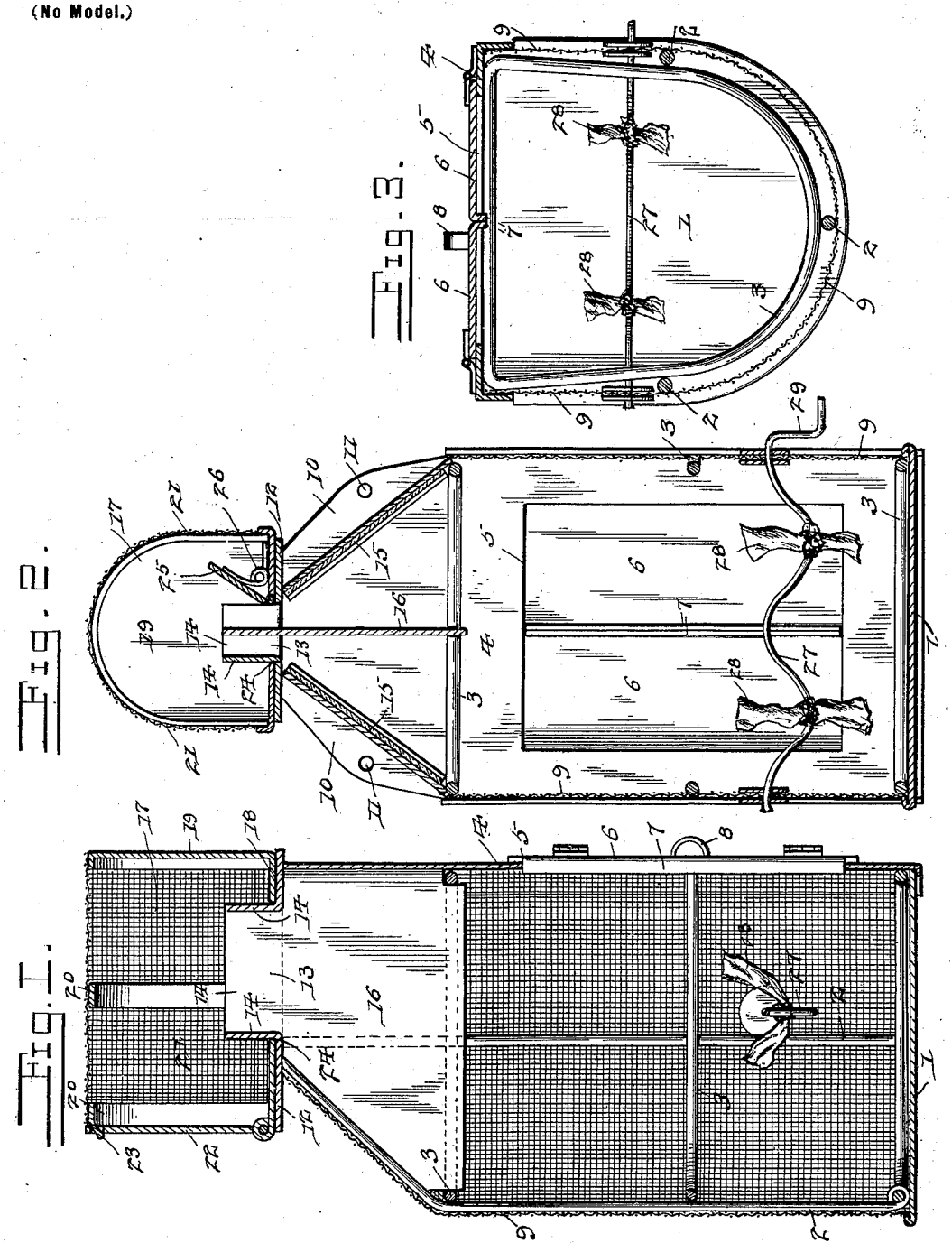

HENRY HOCKETT, OF ALLEN COUNTY, KANSAS.

INSECT-TRAP.

SPECIFICATION forming part of Letters Patent No. 651,760, dated June 12, 1900.

Application filed February 28, 1900. Serial No. 6,814. (No model.)

*To all whom it may concern:*

Be it known that I, HENRY HOCKETT, a citizen of the United States, residing in the county of Allen, in the State of Kansas, have invented a new and useful Insect-Trap, of which the following is a specification.

This invention relates to insect-traps, and is especially designed for catching flies.

The object of the invention is to provide means for facilitating the entrance of the insects into the trap and to arrange for conveniently removing the insects from the trap when it is desired to kill the former. It is furthermore designed to provide means for driving or inducing the insects from a main-entrance compartment into a smaller compartment, which is removable, so that it may be disconnected from the trap proper to facilitate the killing of the insect, and, finally, to provide for automatically closing the entrance into the removable compartment when the latter is taken from the trap in order that the insects may not escape.

With these and other objects in view the present invention consists in the combination and arrangement of parts, as will be hereinafter more fully described, shown in the accompanying drawings, and particularly pointed out in the accompanying claims, it being understood that changes in the form, proportion, size, and minor details may be made within the scope of the claims without departing from the spirit or sacrificing any of the advantages of the invention.

In the drawings, Figure 1 is a vertical central longitudinal sectional view of an insect-trap constructed in accordance with the present invention. Fig. 2 is a transverse sectional view taken at right angles to Fig. 1. Fig. 3 is a transverse horizontal sectional view of the trap.

Corresponding parts in the several figures of the drawings are designated by like characters of reference.

Referring to the accompanying drawings, it will be seen that the trap comprises a main or entrance compartment having a flat bottom 1, preferably of metal, from which rise suitable uprights 2, which are preferably formed of strong stiff wire. The bottom is substantially segmental in shape, and between the ends of the upright rods are the substantially D-shaped cross-rods 3, which connect said upright rods. The frame formed by these wire rods is completed by the front plate 4, which is provided with a suitable entrance-opening 5, that may be closed by the opposite outwardly-swinging doors 6, which are hinged to the opposite longitudinal edges of the doorway. The meeting edges of these doors are provided with the inwardly-directed longitudinal flanges 7, the outer edges of which are designed to abut and form a substantially-tight closure. One or both doors may be provided with any suitable form of handle 8 for opening the doors from the exterior of the trap. The frame formed by the wire rods is covered with wire-netting or other foraminous material 9, so that the trap may be light in weight and also to freely admit light into the interior thereof.

As best indicated in Fig. 1 of the drawings, the uprights of the frame converge adjacent to their upper ends, so as to contract the upper portion of the main compartment, and the front plate continues for its entire width, so as to form the opposite wings 10, having the perforations 11, to receive suitable fastenings whereby the trap may be hung up to the upper portion of a door-frame or window, so that the insects passing therethrough may be enticed to enter the trap through the entrance-opening in the front plate.

The upper end of the trap is closed by means of a plate 12, which projects at the sides of the trap, except at the front side thereof, so as to form a platform for supporting the removable compartment, as will be hereinafter fully explained. Provided centrally of the platform is an exit-opening 13, which is formed by cutting away the plate and bending such cut-away portions upwardly into the upstanding flanges 14, that form a passage for the exit of the insects. The opposite inwardly-inclined sides of the main compartment, which are adjacent to the front plate, are formed by plates of glass or other transparent material 15, which have their upper ends terminating at the adjacent side edges of the central opening in the platform 12, and the rear side of the compartment also inclines inwardly to the rear edge of the opening, so that in crawling up the sides of the trap the insects are conveniently led to the exit-opening. Extending at substantially right angles to the front plate is a transverse partition 16, which extends for the entire width of the trap and terminates at its lower edge, at about the point where the sides of the trap begin to converge; also, this partition extends upwardly into the passage 14, so as to divide the latter into two passages, both of which communicate with the main compartment.

Removably seated upon the platform 12 is a compartment 17, which comprises a flat metallic bottom 18, a portion of which is turned up so as to form one end 19 of the compartment. Extending transversely of the bottom piece is a plurality of arched frame-bars 20, that are designed to be covered with suitable foraminous material 21. Opposite the fixed end 19 is a hinged end or door 22, the free end of which is held in its closed position by means of a suitable spring-catch 23. Formed in the bottom of this compartment is an opening 24, to receive the walls of the passage 13, and hinged to one edge of this opening is a door 25, that is normally urged toward a closed position by means of a suitable spring 26, so that when the compartment 17 is removed the door will automatically close to prevent escape of the insects within the compartment.

Mounted transversely of the main compartment of the trap is a shaft 27, that is provided with fan-blades 28, preferably formed of textile material and also having a suitable operating crank or handle 29 located upon the outer side of the trap, whereby the crank may be conveniently operated to swing the blades in a circular path to induce the insects to travel toward the upper end of the trap and through the exit-opening 13 into the removable compartment, which latter is removable, so that it may be taken from the trap for the purpose of killing the insects in any preferred manner.

It will be understood that the doors 6 are normally open, so as to admit the insects, and the glass or other transparent portions of the upper inclined sides of the trap are designed to attract the insects by reason of the light that shines therethrough to travel upwardly and into the removable compartment. The purpose of the partition is to compel the insects to travel upwardly and out through the exit-opening.

What I claim is—

1. An insect-trap, comprising a main compartment, having a normally-open exit, a removable compartment, having a normally-open entrance-opening in communication with the exit, a closure for the entrance-opening, and means for automatically operating the closure to close the entrance-opening, by a removal of the removable compartment.

2. An insect-trap, comprising a main compartment, having an exit-opening, and a removable compartment, having an entrance-opening to communicate with the exit-opening of the main compartment, and a spring-actuated door for the entrance-opening and to automatically close the latter when the removable compartment is taken from the trap.

3. An insect-trap, comprising a main compartment, having an exit-opening, provided with outwardly-directed walls, and a removable compartment, having an entrance-opening to receive the outwardly-directed walls of the main compartment, a spring-actuated door for the entrance-opening, and which is normally held open by the outwardly-directed walls.

4. An insect-trap, comprising a main compartment, having convergent wall portions, a front wall extending beyond the converged wall portions, to form supporting-wings, an exit-opening between the convergent wall portions, an entrance-opening in the front wall, a closure for the entrance-opening, and a removable compartment in communication with the exit-opening.

5. An insect-trap, comprising a main compartment, having an exit-opening at one end, a removable compartment in communication with the exit-opening, and a fan or like agitating device at the opposite end of the main compartment.

6. An insect-trap, comprising a main compartment, having an entrance-opening, convergent wall portions, an exit between the convergent wall portions, the latter being formed partly of glass, upwardly-extending walls surrounding the exit and located exteriorly of the main compartment, a platform surrounding the base of the walls, a fan or like agitating device located within the main compartment, and a removable compartment supported upon the platform, and having an opening receiving the upwardly-extending walls, and a spring-actuated closure for the opening, said closure being normally held open by the walls.

In testimony that I claim the foregoing as my own I have hereto affixed my signature in the presence of two witnesses.

HENRY HOCKETT.

Witnesses:
 GEO. N. ROBBINS,
 WARREN HOCKETT.